(12) United States Patent
Hagiwara

(10) Patent No.: US 7,215,735 B2
(45) Date of Patent: May 8, 2007

(54) CT IMAGE PRODUCTION METHOD AND X-RAY CT SYSTEM

(75) Inventor: Akira Hagiwara, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 117 days.

(21) Appl. No.: 11/125,030

(22) Filed: May 9, 2005

(65) Prior Publication Data

US 2005/0254618 A1 Nov. 17, 2005

(30) Foreign Application Priority Data

May 11, 2004 (JP) ............................. 2004-140668

(51) Int. Cl.
*A61B 6/00* (2006.01)
(52) U.S. Cl. .................... 378/19; 378/4; 378/15; 378/901; 382/131
(58) Field of Classification Search ............... 378/4, 378/15, 19, 901, 210; 250/336.1, 200, 472.1; 382/128–134
See application file for complete search history.

(56) References Cited

U.S. PATENT DOCUMENTS

| | | | |
|---|---|---|---|
| 4,882,679 A | 11/1989 | Tuy et al. | |
| 5,742,060 A | 4/1998 | Ashburn | |
| 6,061,421 A | 5/2000 | Hagiwara | |
| 6,445,764 B2 | 9/2002 | Gohno et al. | |
| 6,541,763 B2 | 4/2003 | Lingren et al. | |
| 6,795,522 B2 | 9/2004 | Nishide et al. | |
| 6,865,247 B2 | 3/2005 | Hagiware | |
| 2005/0100127 A1* | 5/2005 | Zhao et al. | 378/19 |
| 2005/0276375 A1* | 12/2005 | Urushiya | 378/19 |

FOREIGN PATENT DOCUMENTS

JP 2003-334188 11/2003

* cited by examiner

*Primary Examiner*—Akm Ullah
*Assistant Examiner*—Anthony K. Cochran
(74) *Attorney, Agent, or Firm*—Carl B. Horton, Esq.; Armstrong Teasdale LLP

(57) ABSTRACT

A method to make a common procedure adaptable to reconstruction planes whose positions relative to a multi-channel detector are different from one another. A reference procedure required for construction of a CT image based on reference linear data representing one line or a plurality of lines formed on a reference reconstruction plane is preserved. Real data associated with a first reconstruction plane different from the reference reconstruction plane is used to produce virtual reference linear data equivalent to the reference linear data. A CT image is reconstructed based on the virtual reference linear data using the reference procedure.

14 Claims, 13 Drawing Sheets

Directions of channels

Directions of detector arrays

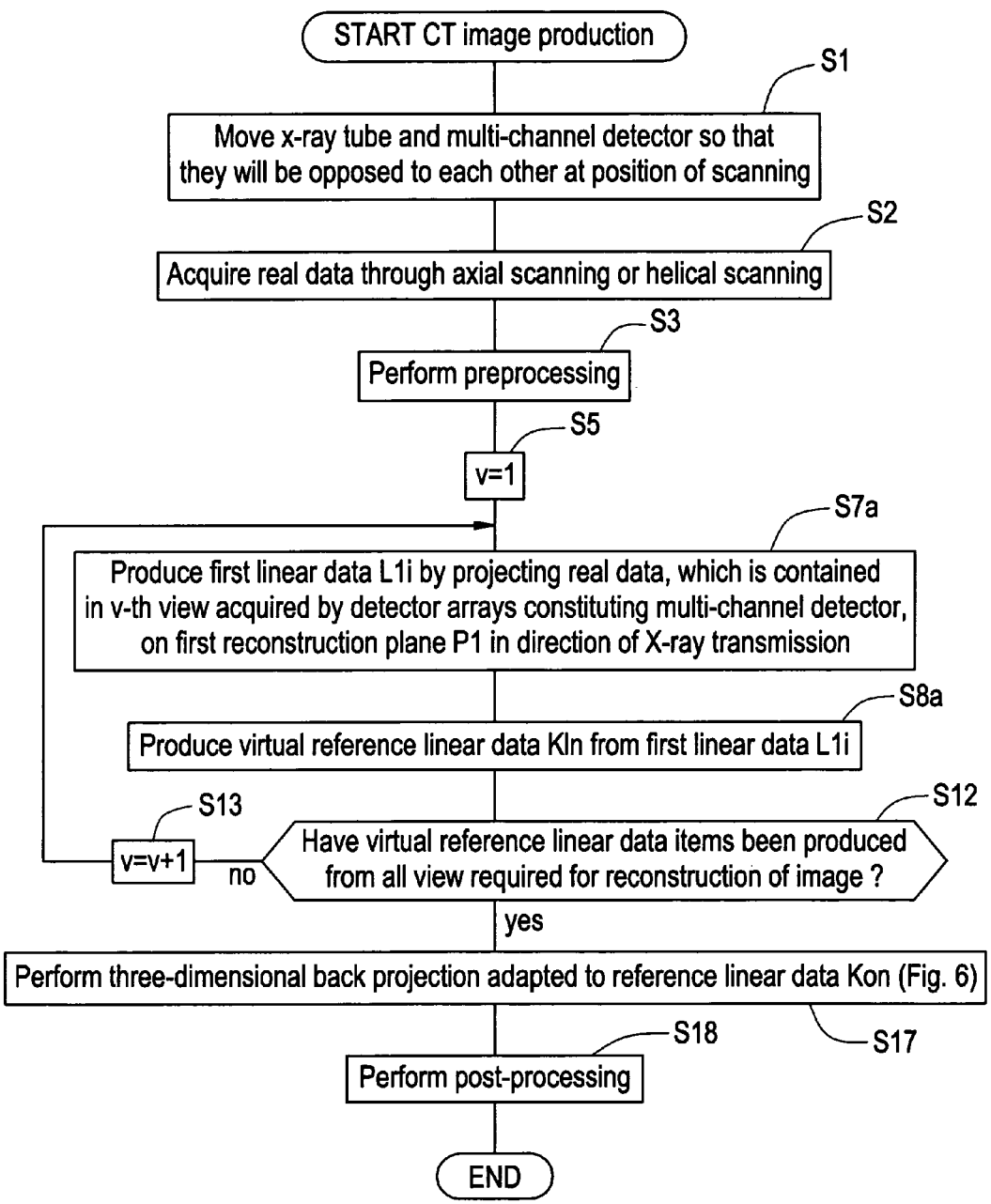

CT IMAGE PRODUCTION METHOD AND X-RAY CT SYSTEM

CROSS REFERENCE TO RELATED APPLICATIONS

This application claims the benefit of Japanese Application No. 2004-140668 filed May 11, 2004.

BACKGROUND OF THE INVENTION

The present invention relates to a computed tomography (CT) image production method and an X-ray CT system. More particularly, the present invention relates to a CT image production method and an X-ray CT system in which production of a large amount of data that is not actually used to construct a CT image can be avoided and a common procedure can be adapted to reconstruction planes whose positions relative to a multi-channel detector are different from one another.

One of the CT image production methods that have been known in the past is such that: real data that is acquired by detector arrays included in a multi-channel detector and that is contained in one of the views required for reconstruction of an image is projected onto a projection plane, which is a virtual plane, in a direction of X-ray transmission, and then interpolated or extrapolated on the projection plane in order to produce high-density data; data representing lines formed on a reconstruction plane with a space corresponding to a plurality of pixels between adjoining lines is sampled from the high-density data, and then interpolated or extrapolated on the reconstruction plane in order to produce interlinear data; and the foregoing processing is repeated in order to summate data items, which are produced from all the views required for reconstruction of an image on the reconstruction plane, pixel by pixel for the purpose of constructing a CT image (refer to, for example, Patent Document 1).

[Patent Document 1] Japanese Unexamined Patent Application Publication No. 2003-334188

Assume that a plurality of reconstruction planes whose positions relative to a multi-channel detector are different from one another is designated. The foregoing conventional CT image production method has the advantage that a procedure starting with sampling of data, which represents lines formed on a reconstruction plane with a space corresponding to a plurality of pixels between adjoining lines, from high-density data and ending with construction of a CT image can be adapted in common irrespective of the relative positions of reconstruction planes.

However, since a large amount of data that is not actually used to construct a CT image is produced on a projection plane, a processing time is too long.

In contrast, according to another CT image production method, real data that is acquired by detector arrays included in a multi-channel detector and that contained in one of the views required for reconstruction of an image is projected onto a reconstruction plane in a direction of X-ray transmission in order to produce linear data. The linear data is interpolated or extrapolated on the reconstruction plane, whereby data is produced on the reconstruction plane. This processing is repeated, and resultant data items produced from all the views, which are required for reconstruction of an image, on the reconstruction plane in order to construct a CT image.

According to the CT image production method, production of a large amount of data, which is not actually used to construct a CT image, on a projection plane can be avoided.

However, since the position of linear data is different among a plurality of reconstruction planes whose positions relative to a multi-channel detector are different from one another, a procedure starting with production of linear data and ending with construction of a CT image must be programmed for each of the reconstruction planes.

SUMMARY OF THE INVENTION

Therefore, an object of the present invention is to provide a CT image production method and an X-ray CT system in which production of a large amount of data that is not actually used to construct a CT image can be avoided and a common procedure can be adapted to reconstruction planes whose positions relative to a multi-channel detector are different from one another.

According to the first aspect of the present invention, there is provided a CT image production method. According to the CT image product method, a reference procedure required for construction of a CT image based on reference linear data representing one line or a plurality of lines formed on a reference reconstruction plane is preserved. Virtual reference linear data equivalent to the reference linear data is produced from real data associated with a first reconstruction plane difference from the reference reconstruction plane. Based on the virtual reference linear data, a CT image is reconstructed using the reference procedure.

In the CT image production method according to the first aspect, real data associated with the first reconstruction plane whose position relative to a multi-channel detector is different from that of the reference reconstruction plane is used to produce virtual reference linear data equivalent to the reference linear data on the reference reconstruction plane. The reference procedure is adapted to the virtual reference linear data in order to reconstruct a CT image. This makes it possible to avoid production of a large amount of data that is not actually used to reconstruct a CT image. Moreover, the reference procedure can be adapted in common to reconstruction planes whose positions relative to the multi-channel detector are different from one another. This is preferable in terms of implementation of the reference procedure in hardware.

The real data may be data produced by converting data, which is acquired from a cone beam by detector arrays, from a fan-shaped form to a parabolic form.

According to the second aspect of the present invention, there is provided a CT image production method subordinate to the foregoing CT image production method. Herein, first linear data deployed by projecting real data, which is acquired by detector arrays included in the multi-channel detector, on the first reconstruction plane in the direction of X-ray transmission is used to produce virtual reference linear data equivalent to the reference linear data.

In the CT image production method according to the second aspect, the virtual reference linear data is produced by interpolating or extrapolating the first linear data. Thus, interpolation or extrapolation is needed. However, since real data acquired by the detector arrays included in the multi-channel detector is projected onto the first reconstruction plane in the direction of X-ray transmission in order to produce the first linear data, production of the first linear data is easy to do.

On the other hand, according to another method of producing virtual reference linear data, lines equivalent to lines on the reference reconstruction plane are formed on the first reconstruction plane, and projected onto the surface of the multi-channel detector in the direction of X-ray transmission. Real data associated with the lines projected onto the surface of the multi-channel detector is then sampled. This method obviates the necessity of interpolation or extrapolation. However, the process of sampling real data is complex.

According to the third aspect of the present invention, there is provided a CT image production method according to which a reference procedure required for construction of a CT image based on reference linear data representing one line or a plurality of lines on a reference reconstruction plane is preserved. Real data associated with a first reconstruction plane different from the reference reconstruction plane is used to produce first virtual reference linear data equivalent to the reference linear data. Real data associated with a second reconstruction plane different from the first reconstruction plane is used to produce second virtual reference linear data equivalent to the reference linear data. Based on data produced by weighting and summating the first virtual reference linear data and second virtual reference linear data, one CT image is reconstructed using the reference procedure.

In the CT image production method according to the third aspect, virtual reference linear data items relevant to different reconstruction planes are weighted and summated. Therefore, Z-buffering can be performed with one execution of the reference procedure. Z-buffering of data relevant to three or more reconstruction planes can be performed in the same manner.

Incidentally, the real data may be data produced by converting data, which is acquired from a cone beam by the detector arrays, from a fan-shaped form to a parabolic form.

According to the fourth aspect of the present invention, there is provided a CT image production method subordinate to the foregoing CT image production method. Herein, the first linear data deployed by projecting real data, which is acquired by detector arrays included in the multi-channel detector, on the first reconstruction plane in the direction of X-ray transmission is used to produce the first virtual reference linear data. The second linear data deployed by projecting real data, which is acquired by detector arrays included in the multi-channel detector, on the second reconstruction plane in the direction of X-ray transmission is used to produce the second virtual reference linear data.

In the CT image production method according to the fourth aspect, the first linear data is interpolated or extrapolated in order to produce the first virtual reference linear data, and the second linear data is interpolated or extrapolated in order to produce the second virtual reference linear data. Thus, interpolation or extrapolation is needed. However, since the real data acquired by the detector arrays included in the multi-channel detector is projected onto both of the first and second reconstruction planes in the direction of X-ray transmission in order to produce the first linear data and second linear data. Therefore, the process of producing the first and second linear data items is simple.

On the other hand, according to another method of producing the first and second virtual reference linear data items, lines equivalent to the lines on the reference reconstruction plane are formed on both of the first and second reconstruction planes. The lines formed on the first and second reconstruction planes are projected onto the surface of the multi-channel detector in the direction of X-ray transmission. Real data associated with the lines projected onto the surface of the multi-channel detector is sampled.

This method obviates the necessity of interpolation or extrapolation. However, the process of sampling real data is complex.

According to the fifth aspect of the present invention, there is provided a CT image production method according to which a reference procedure required for construction of a CT image based on reference linear data representing one line or a plurality of lines on a reference reconstruction plane is preserved. First real data is acquired at a first position, and second real data contained in the same view as the first real data is or in an opposite view is acquired at a second position. First virtual reference linear data equivalent to the reference linear data is produced from the first real data associated with a first reconstruction plane identical to or different from the reference reconstruction plane. Second virtual reference linear data equivalent to the reference linear data is produced from the second real data associated with the first reconstruction plane. Based on data produced by weighting and summating the first virtual reference linear data and second virtual reference linear data, one CT image is reconstructed using the reference procedure.

In the CT image production method according to the fifth aspect, data produced by weighting and summating virtual reference linear data items produced from a plurality of real data items is used as virtual reference linear data associated with one reconstruction plane. Consequently, an amount of information increases and image quality improves.

The real data may be data produced by converting data, which is acquired from a cone beam by detector arrays, from a fan-shaped form to a parabolic form.

According to the sixth aspect of the present invention, there is provided a CT image production method subordinate to the foregoing CT image production method. Herein, first virtual reference data is produced from first linear data deployed by projecting real data, which is acquired at the first position by detector arrays included in the multi-channel detector, on the first reconstruction plane in the direction of X-ray transmission. Second virtual reference data is produced from second linear data deployed by projecting real data, which is acquired at the second position by detector arrays included in the multi-channel detector, on the first reconstruction plane in the direction of X-ray transmission.

In the CT image production method according to the sixth aspect, the first virtual reference linear data is produced by interpolating or extrapolating the first linear data, and the second virtual reference linear data is produced by interpolating or extrapolating the second linear data. Thus, interpolation or extrapolation is needed. However, since the first and second real data items acquired by detector arrays included in the multi-channel detector are projected onto the first reconstruction plane in the directions of X-ray transmission in order to produce the first and second linear data items, the process of producing the first and second linear data items is simple.

On the other hand, according to another method of producing the first and second virtual reference linear data items, lines equivalent to the lines on the reference reconstruction plane are formed on the first reconstruction plane, and the lines formed on the first reconstruction plane are projected onto the first and second positions on the surface of the multi-channel detector in the directions of X-ray transmission. The first and second real data items associated with the lines projected onto the first and second positions on the surface of the multi-channel detector are then sampled.

This method obviates the necessity of interpolation or extrapolation. However, the process of sampling the real data items is complex.

According to the seventh aspect of the present invention, there is provided a CT image production method subordinate to the foregoing CT image production method. The lines are lines formed by projecting detector arrays included in the multi-channel detector on the reference reconstruction plane.

In the CT image production method according to the seventh aspect, production of reference linear data representing the lines on the reference reconstruction plane is easy to do.

According to the eighth aspect of the present invention, there is provided a CT image production method subordinate to the foregoing CT image production method. Herein, the lines are one straight line formed on the reference reconstruction plane or a plurality of straight lines formed thereon with a space corresponding to a plurality of pixels between adjoining lines.

In the CT image production method according to the eighth aspect, since the lines are straight lines, interpolation or extrapolation for producing interlinear data is simple.

According to the ninth aspect of the present invention, there is provided an X-ray CT system comprising: an X-ray tube; a multi-channel detector; a scanning means for acquiring real data by relatively rotating at least one of the X-ray tube and multi-channel detector about an object of radiography, or for acquiring real data by relatively rotating at least one of the X-ray tube and multi-channel detector about the object of radiography and rectilinearly moving the X-ray tube and multi-channel detector relative to the object of radiography; a reference procedure preserving means for preserving a reference procedure required for construction of a CT image based on reference linear data representing one line or a plurality of lines formed on a reference reconstruction plane; a virtual reference linear data producing means for producing virtual reference linear data equivalent to the reference linear data from real data associated with a first reconstruction plane different from the reference reconstruction plane; and a reconstructing means for reconstructing a CT image using the reference procedure on the basis of the virtual reference linear data.

In the X-ray CT system according to the ninth aspect, the CT image production method in accordance with the first aspect is preferably implemented.

According to the tenth aspect of the present invention, there is provided an X-ray CT system subordinate to the foregoing X-ray CT system. Herein, the virtual reference linear data producing means produces virtual reference linear data equivalent to the reference linear data from first linear data deployed by projecting real data, which is acquired by detector arrays included in the multi-channel detector, on the first reconstruction plane in the direction of X-ray transmission.

In the X-ray CT system according to the tenth aspect, the CT image production method in accordance with the second aspect is preferably implemented.

According to the eleventh aspect of the present invention, there is provided an X-ray CT system comprising: an X-ray tube; a multi-channel detector; a scanning means for acquiring real data by relatively rotating at least one of the X-ray tube and multi-channel detector about an object of radiography, or for acquiring real data by relatively rotating at least one of the X-ray tube and multi-channel detector about the object of radiography and rectilinearly moving the X-ray tube and multi-channel detector relative to the object of radiography; a reference procedure preserving means for preserving a reference procedure required for construction of a CT image based on reference linear data representing one line or a plurality of lines on a reference reconstruction plane; a virtual reference linear data producing means for producing first virtual reference linear data equivalent to the reference linear data from real data associated with a first reconstruction plane different from the reference reconstruction plane, and also producing second virtual reference linear data equivalent to the reference linear data from real data associated with a second reconstruction plane different from the first reconstruction plane; and a reconstructing means for reconstructing one CT image using the reference procedure on the basis of data produced by weighting and summating the first virtual reference linear data and second virtual reference linear data.

In the X-ray CT system according to the eleventh aspect, the CT image production method in accordance with the third aspect is preferably implemented.

According to the twelfth aspect of the present invention, there is provided an X-ray CT system subordinate to the foregoing X-ray CT system. Herein, the virtual reference linear data producing means produces the first virtual reference linear data from the first linear data deployed by projecting real data, which is acquired by detector arrays included in the multi-channel detector, on the first reconstruction plane in the direction of X-ray transmission. The virtual reference linear data producing means also produces the second virtual reference linear data from the second linear data deployed by projecting real data, which is acquired by detector arrays included in the multi-channel detector, on the second reconstruction plane in the direction of X-ray transmission.

In the X-ray CT system according to the twelfth aspect, the CT image production method in accordance with the fourth aspect is preferably implemented.

According to the thirteenth aspect of the present invention, there is provided an X-ray CT system comprising: an X-ray tube; a multi-channel detector; a scanning means for acquiring real data by relatively rotating at least one of the X-ray tube and multi-channel detector about an object of radiography, or for acquiring real data by relatively rotating at least one of the X-ray tube and multi-channel detector about the object of radiography and rectilinearly moving the X-ray tube and multi-channel detector relative to the object of radiography; a reference procedure preserving means for preserving a reference procedure required for construction of a CT image based on reference linear data representing one line or a plurality of lines on a reference reconstruction plane; a virtual reference linear data producing means for producing first virtual reference linear data equivalent to the reference linear data from first real data acquired at the first position and associated with a first reconstruction plane identical to or different from the reference reconstruction plane, and also producing second virtual reference linear data equivalent to the reference linear data from second real data that is contained in the same view as the first real data is or in an opposite view, acquired at the second position different from the first position, and associated with the first reconstruction plane; and a reconstructing means for reconstructing one CT image using the reference procedure on the basis of data produced by weighting and summating the first virtual reference linear data and second virtual reference linear data.

In the X-ray CT system according to the thirteenth aspect, the CT image production method in accordance with the fifth aspect is preferably implemented.

According to the fourteenth aspect of the present invention, there is provided an X-ray CT system subordinate to the foregoing X-ray CT system. Herein, the virtual reference linear data producing means produces the first virtual reference linear data from the first linear data deployed by projecting real data, which is acquired by detector arrays included in the multi-channel detector at the first position, on the first reconstruction plane in the direction of X-ray transmission. The virtual reference linear data producing means also produces the second virtual reference linear data from the second linear data deployed by projecting real data, which is acquired by detector arrays included in the multi-channel detector at the second position, on the first reconstruction plane in the direction of X-ray transmission.

In the X-ray CT system according to the fourteenth aspect, the CT image production method in accordance with the sixth aspect is preferably implemented.

According to the fifteenth aspect of the present invention, there is provided an X-ray CT system subordinate to the foregoing X-ray CT system. Herein, the lines are straight lines or curves formed by projecting detector arrays included in the multi-channel detector on the reference reconstruction plane in the direction of X-ray transmission.

In the X-ray CT system according to the fifteenth aspect, the CT image production method in accordance with the seventh aspect is preferably implemented.

According to the sixteenth aspect of the present invention, there is provided an X-ray CT system subordinate to the foregoing X-ray CT system. Herein, the lines refer to one straight line formed on the reference reconstruction plane or a plurality of straight lines formed thereon with a space corresponding to a plurality of pixels between adjoining lines.

In the X-ray CT system according to the sixteenth aspect, the CT image production method in accordance with the eighth aspect is preferably implemented.

According to a CT image production method and an X-ray CT system in which the present invention is implemented, production of a large amount of data that is not actually used to construct a CT image can be avoided, and a common procedure can be adapted to reconstruction planes whose positions relative to a multi-channel detector are different from one another.

A CT image production method and an X-ray CT system in accordance with the present invention make it possible to implement a reference procedure in hardware.

Further objects and advantages of the present invention will be apparent from the following description of the preferred embodiments of the invention as illustrated in the accompanying drawings.

BRIEF DESCRIPTION OF THE DRAWINGS

FIG. 11 is a flowchart describing CT image production in accordance with the first embodiment.

DETAILED DESCRIPTION OF THE INVENTION

The present invention will be further described below in conjunction with embodiments shown in drawings. Noted is that the present invention will not be limited to the embodiments.

[First Embodiment]

Figure 1:
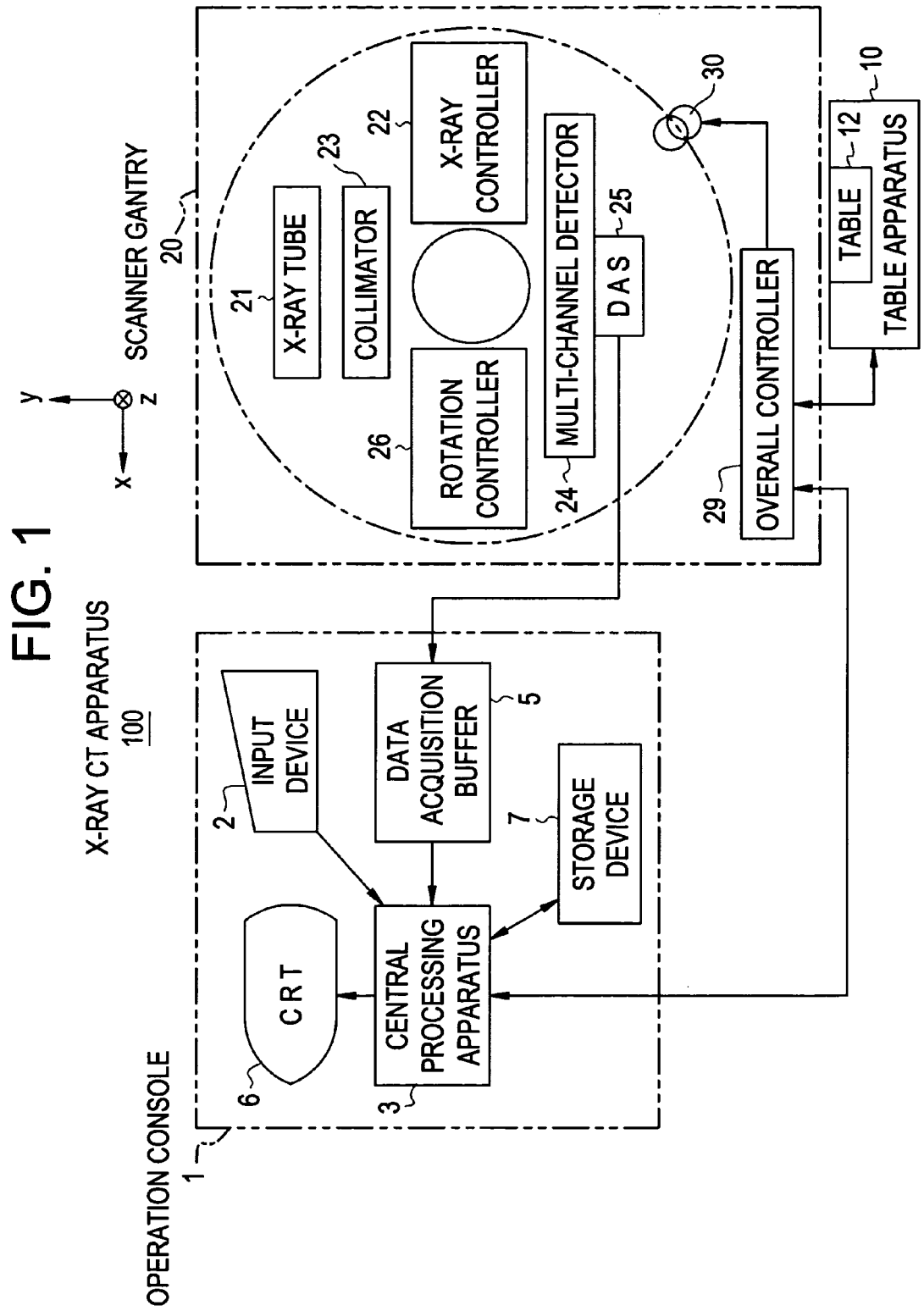
FIG. 1 is a block diagram of an X-ray CT system in accordance with the first embodiment of the present invention.

FIG. 1 is a block diagram showing the configuration of an X-ray CT system 100 in accordance with the first embodiment.

The X-ray CT system 100 comprises an operator console 1, a radiographic table assembly 10, a scanner gantry 20.

The operator console 1 comprises an input device 2 that receives an operator's entry, a central processing unit 3 that executes a scan control process or image reconstruction, a data collection buffer 5 in which data acquired by the scanner gantry 20 is recorded, a CRT 6 on which a reconstructed CT image is displayed, and a storage device 7 in which programs, data, and CT images are stored.

The radiographic table assembly 10 includes a radiographic table 12 on which an object of radiography lies down and which carries the object of radiography into or out of a bore of the scanner gantry 20. The radiographic table 12 is raised or lowered and rectilinearly moved by a motor incorporated in the radiographic table assembly 10.

The scanner gantry 20 comprises: an X-ray tube 21; an X-ray controller 22; a collimator 23; a multi-channel detector 24; a data acquisition system (DAS) 25; a rotating-side controller 26 for controlling the X-ray controller 22, the collimator 23, and the DAS 25; a control unit 29 for transferring a control signal and others with the operator console 1 and radiographic table assembly 10; and a slip ring 30.

Figure 2:
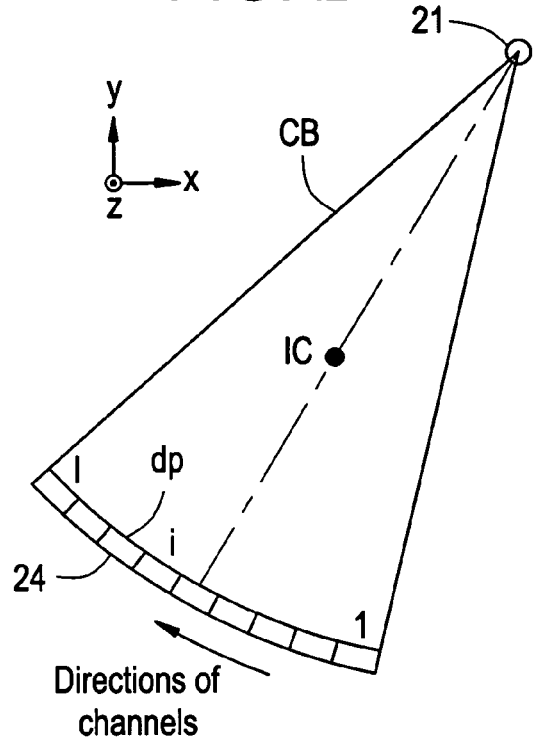
FIG. 2 is an explanatory view showing rotation of an X-ray tube and a multi-channel detector.
Figure 3:
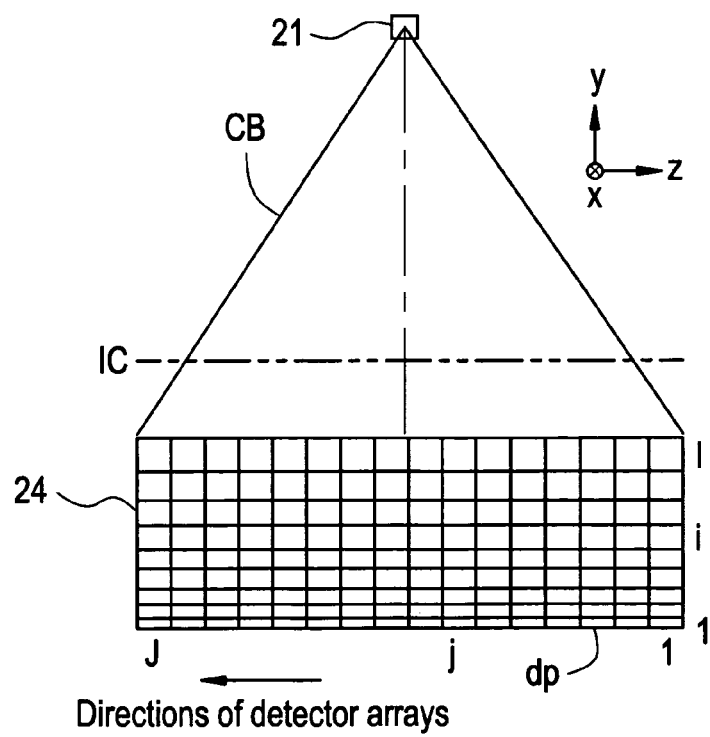
FIG. 3 is an explanatory view showing a cone beam.

FIG. 2 and FIG. 3 are explanatory diagrams showing the X-ray tube 21 and multi-channel detector 24.

The X-ray tube 21 and multi-channel detector 24 rotate about an axis of rotation (isocenter IC). Assuming that the direction of rectilinear movement made by the radiographic table 12 is a z-axis direction, the direction perpendicular to the top of the radiographic table 12 is a y-axis direction, and the direction orthogonal to the z-axis direction and y-axis direction is an x-axis direction, a plane of rotation on which the X-ray tube 21 and multi-channel detector 24 rotate is an xy plane.

The X-ray tube 21 generates an X-ray beam CB that is called a cone beam. When the center-axis direction of the X-ray beam CB is parallel to the y-axis direction, a view angle view shall be 0°.

The multi-channel detector 24 includes J (for example, J equals 256) detector arrays. Moreover, each detector array includes I (for example, I equals 1024) channels.

Figure 4A:
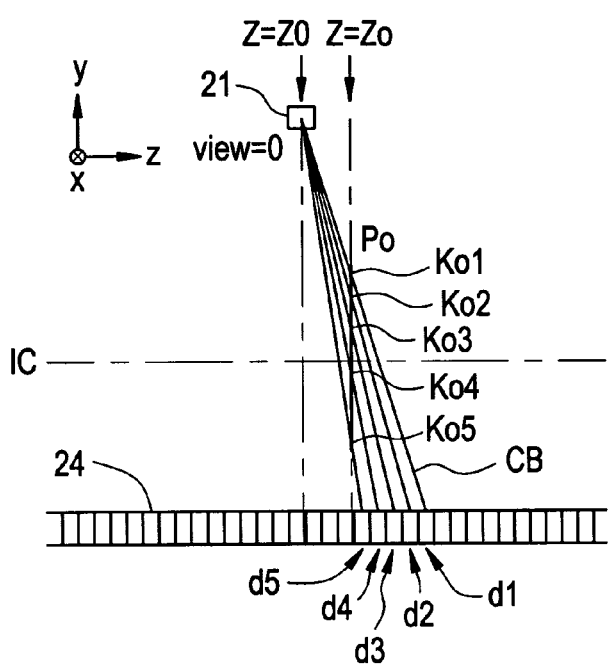
FIGS. 4a and 4b are explanatory views illustrating a reference reconstruction plane.
Figure 4B:
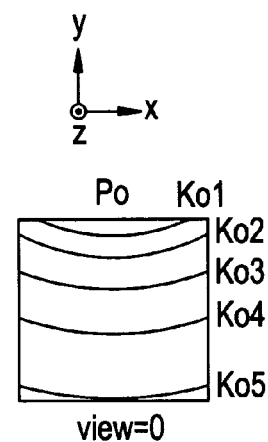

FIGS. 4a and 4b illustratively show the relationship among the X-ray tube 21, the multi-channel detector 24, and a reference reconstruction plane Po attained when the view angle view is 0°.

The reference reconstruction plane Po is located at a reference position Z=Zo.

When the view angle view is 0°, the X-ray tube 21 and multi-channel detector 24 are opposed to each other at a position Z=Z0. During axial scanning, the position remains unchanged. During helical scanning, the position varies depending on the view angle.

Data items produced by deploying real data items, which are acquired by the detector arrays d1 to d5, along lines formed by projecting the detector arrays d1 to d5 included in the multi-channel detector 24 on the reference reconstruction plane Po in a direction of X-ray transmission are referred to as reference linear data items Ko1 to Ko5.

Figure 5:
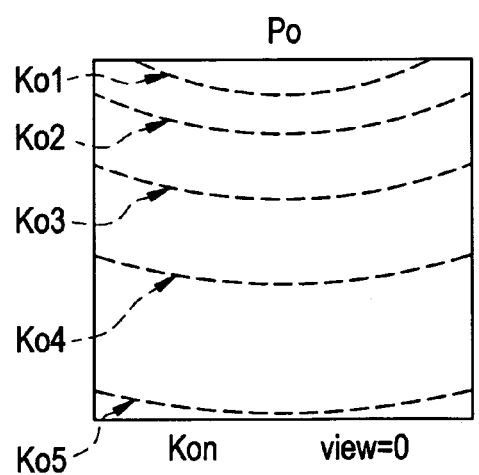
FIG. 5 is a conceptual diagram illustrating reference linear data.

FIG. 5 is a conceptual diagram of the reference linear data items Ko1 to Ko5. Incidentally, Kon denotes generalized reference linear data.

At step R1, one of the views required for reconstruction of an image is selected. The range of view angles at which the views are acquired is, for example, 180° plus an angel of a fan-shaped beam or 360°.

At step R1, one of views required for reconstruction of an image is selected. The range of view angles at which the views are acquired is, for example, 180° plus an angel of a fan-shaped beam or 360°.

Figure 7:
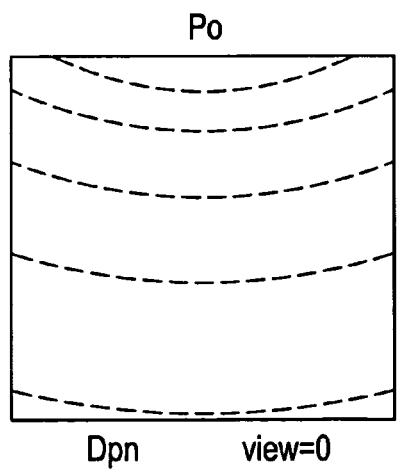
FIG. 7 is a conceptual diagram showing projection line data Dpn produced by multiplying reference linear data Kon, which stems from a view acquired at a view angle view of 0°, by a cone beam reconstruction weight.

At step R2, the reference linear data Kon is multiplied by a cone beam reconstruction weight in order to produce projection line data Dpn shown in FIG. 7.

Herein, the cone beam reconstruction weight is $(r1/r0)^2$ where r0 denotes a distance from the focal spot in the X-ray tube 21 to a detector element that belongs to both a detector array j of the multi-channel detector 24, data acquired by which is used to produce the reference linear data Kon, and a channel i thereof, and r1 denotes a distance from the focal spot in the X-ray tub reconstruction plane Po over which the reference linear data Kon is deployed.

Figure 8:
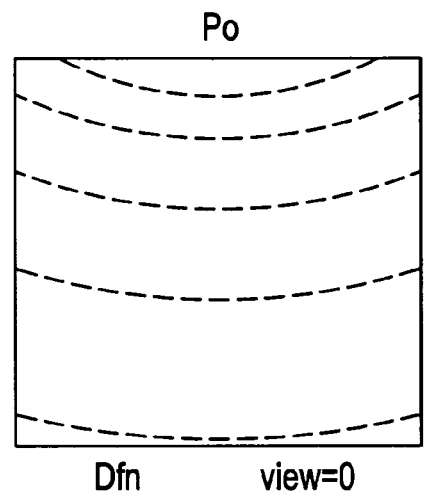
FIG. 8 is a conceptual diagram showing back projection line data Dfn produced by filtering the projection line data Dpn that stems from the view acquired at the view angle view of 0°.

At step R3, the projection line data Dpn is filtered. In other words, the projection line data Dpn is fast-Fourier transformed, multiplied by a filter function (reconstruction function), and inverse-fast-Fourier-transformed. This results in dot-by-dot line data Dfn shown in FIG. 8.

Figure 9:
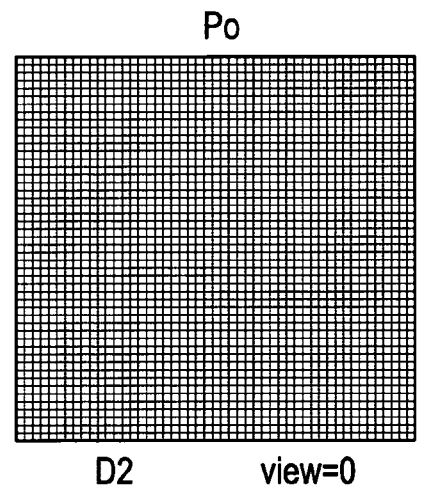
FIG. 9 is a conceptual diagram showing back projection pixel data D2 produced from the back projection line data Dfn that stems from the view acquired at the view angle view of 0°.

At step R4, the dot-by-dot line data Dfn is sampled and, if necessary, interpolated or extrapolated in order to produce, as shown in FIG. 9, back projection pixel data D2 representing pixels that express the reference reconstruction plane Po.

Figure 10:
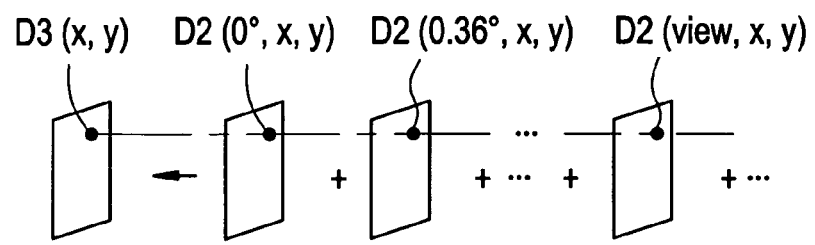
FIG. 10 is an explanatory diagram showing production of back projection data D3 by summating back projection pixel data items D2, which stem from all views, pixel by pixel.

At step R5, back projection pixel data items D2 are, as shown in FIG. 10, summated pixel by pixel.

At step R6, the steps R1 to R5 are repeated relative to all views required for reconstruction of an image in order to produce back projection data $D3(x,y)$. Processing is then terminated.

FIG. 11 is a flowchart illustrating CT image production in accordance with the first embodiment.

At step S1, the X-ray tube 21 and multi-channel detector 24 are moved to be opposed to each other at a desired position of scanning (in practice, the radiographic table 12 is rectilinearly moved).

At step S2, axial scanning or helical scanning is performed in order to acquire real data.

Figure 12A:
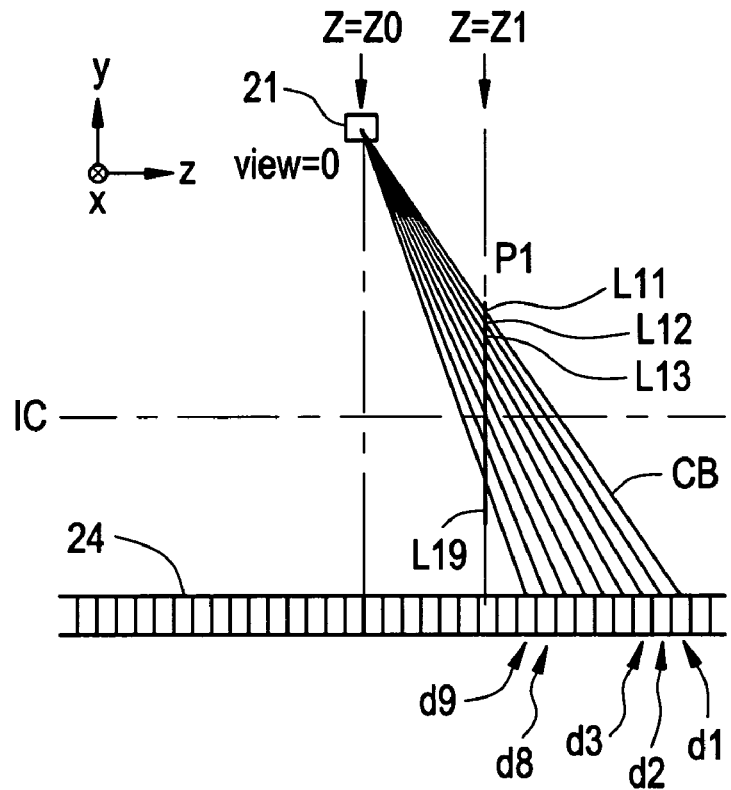
FIGS. 12a and 12b are explanatory diagrams illustrating a first reconstruction plane.

As shown in FIG. 12(a), the X-ray tube 21 and multi-channel detector 24 are moved so that when the view angle view is 0°, they will be opposed to each other at the reference position Z=Z0. Real data shall be acquired in this state. Moreover, a CT image expressing a first reconstruction plane P1 located at a first position Z=Z1 shall be constructed.

Referring back to FIG. 11, at step S3, acquired real data is subjected to preprocessing (including offset correction, logarithmic correction, X-ray dose correction, and sensitivity correction).

At step S7a, as shown in FIG. 11 real data contained in the v-th view and acquired by the detector arrays d1 to d9 included in the multi-channel detector 24 is projected onto a first reconstruction plane P1 in the direction of X-ray transmission in order to produce first linear data items L11 to L19.

Figure 12B:
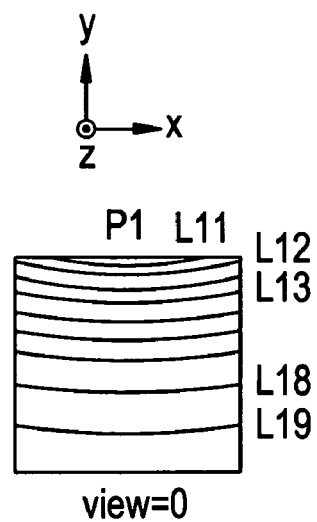

At step S7a, as shown in FIG. 12, real data contained in the v-th view and acquired by the detector arrays d1 to d9 included in the multi-channel detector 24 is projected onto a first reconstruction plane P1 in the direction of X-ray transmission in order to produce first linear data items L11 to L19.

Figure 13:
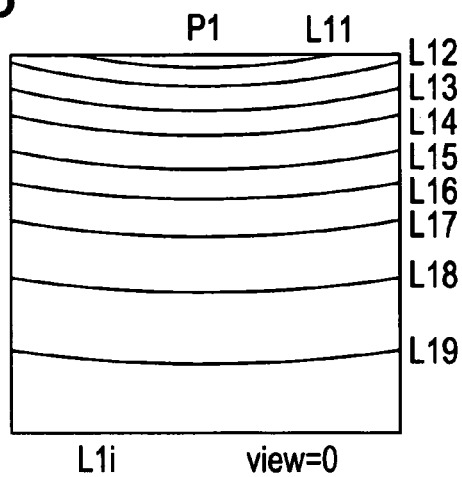
FIG. 13 is a conceptual diagram illustrating first linear data.

FIG. 13 is a conceptual diagram showing the first linear data items L11 to L19. L1i denotes generalized first linear data.

Figure 14:
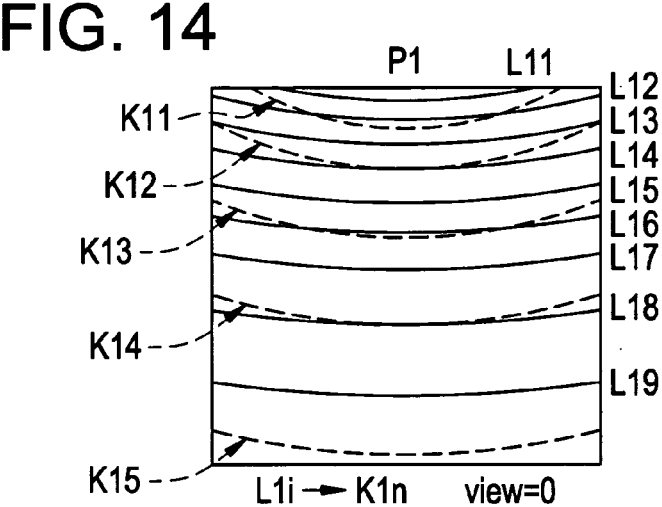
FIG. 14 is a conceptual diagram illustrating the positional relationship between first linear data and virtual reference linear data.

Referring back to FIG. 11, at step S8a, as shown in FIG. 14, virtual reference linear data K1n is produced by interpolating or extrapolating the first linear data L1i. The position of the virtual reference linear data K1n on the first reconstruction plane P1 corresponds to the position of the reference linear data Kon on the reference reconstruction plane Po.

Figure 15:
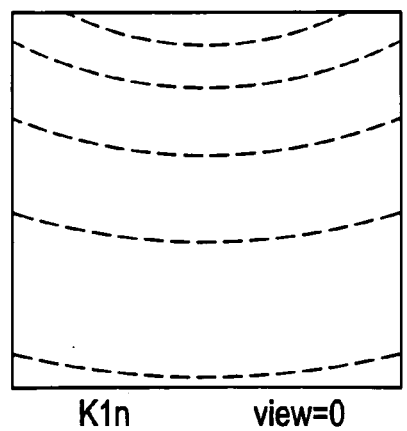
FIG. 15 is a conceptual diagram illustrating virtual reference linear data produced from the first linear data.

FIG. 15 is a conceptual diagram showing the resultant virtual reference linear data K1n.

Referring back to FIG. 11, at step S12, if production of the virtual reference linear data items K1n from all views required for reconstruction of an image is not completed, processing proceeds to step S13. If the production is completed, processing proceeds to step S17.

At step S13, the view number counter v is incremented by one and processing returns to step S7a.

Figure 6:
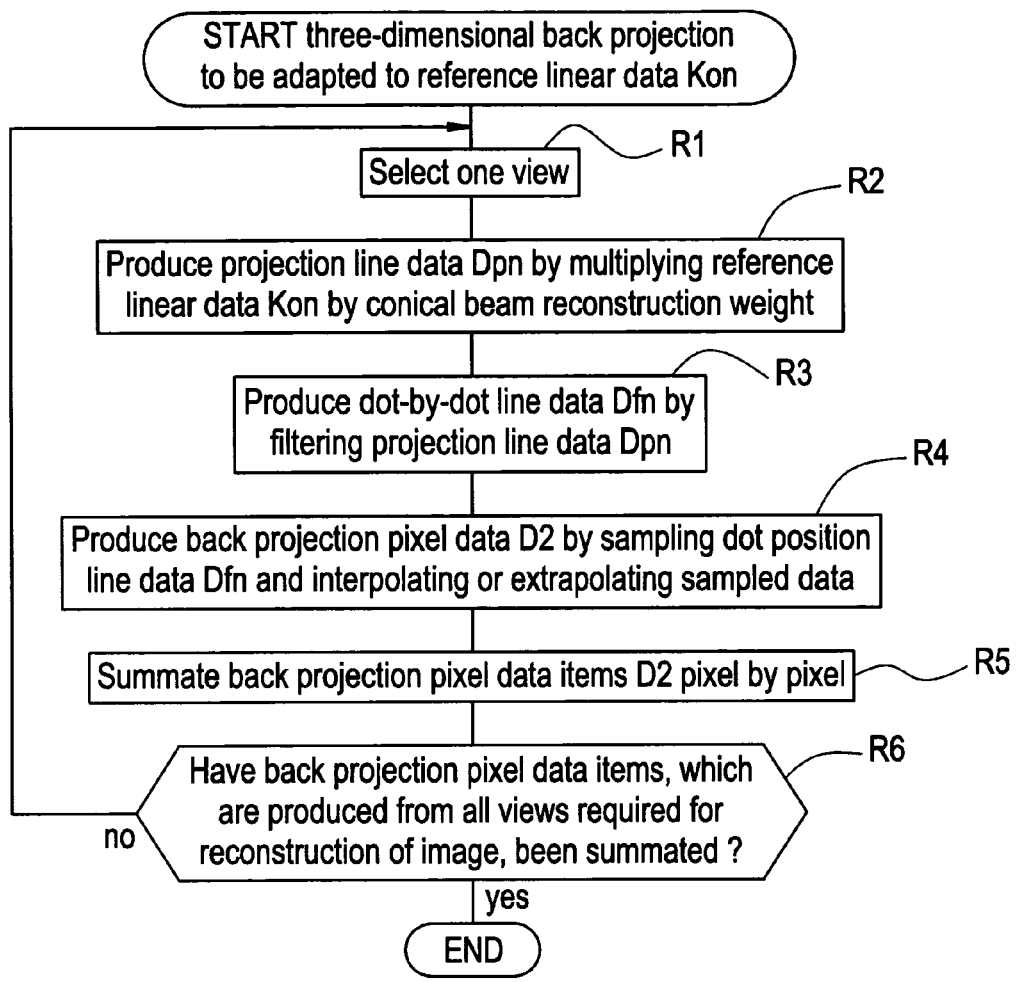
FIG. 6 is a flowchart describing three-dimensional back projection to be adapted to reference linear data.

At step S17, the reference procedure described in FIG. 6 is performed on the virtual reference linear data items K1n in order to produce back projection data $D3(x,y)$.

At step S18, the back projection data $D3(x,y)$ is post-processed in order to construct a CT image. Processing is then terminated.

According to the X-ray CT system 100 of the first embodiment, the reference procedure to be performed on reference linear data Kon deployed on the reference reconstruction plane Po is preserved. Real data associated with the first reconstruction plane P1 whose position relative to the multi-channel detector 24 is different from that of the reference reconstruction plane Po is used to produce the virtual reference linear data L1n equivalent to the reference linear data Kon deployed on the reference reconstruction plane Po. The reference procedure is adapted to the virtual reference linear data items L1n in order to reconstruct a CT image. Thus, production of a large amount of data that is actually not used to construct a CT image is avoided. Moreover, the reference procedure adapted to the reference reconstruction plane Po can be used for the first reconstruction plane P1 whose position relative to the multi-channel detector 24 is different from that of the reference reconstruction plane Po. Consequently, step S17 described in FIG. 6 is preferably implemented in hardware.

Incidentally, the real data may be data produced by converting data, which is acquired from a cone beam by detector arrays, from a fan-shaped form to a parabolic form. In this case, since the detector arrays are supposedly rectilinear, lines formed are straight lines.

[Second Embodiment]

Figure 16:
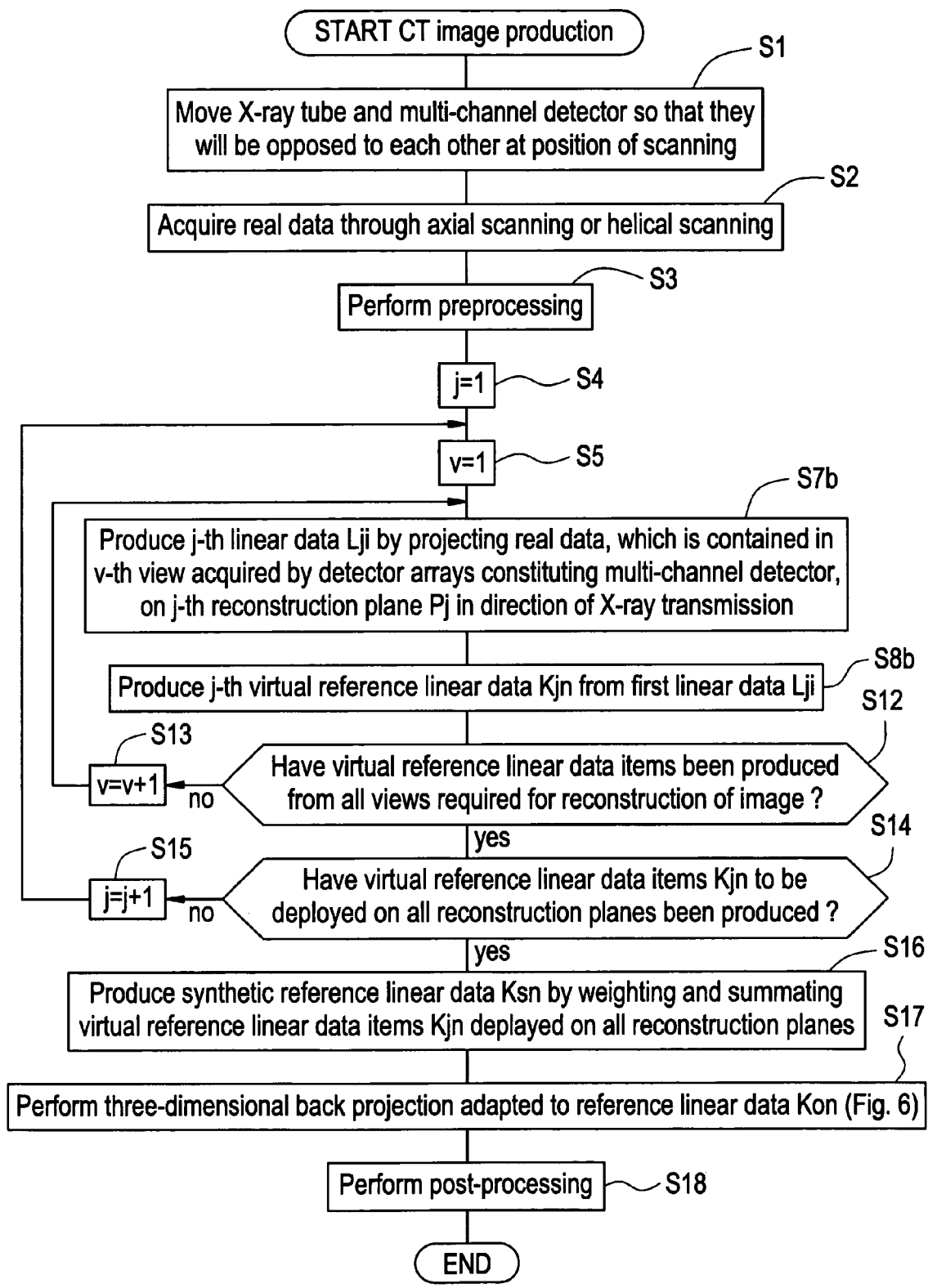
FIG. 16 is a flowchart describing CT image production in accordance with the second embodiment.

FIG. 16 is a flowchart describing CT image production in accordance with the second embodiment.

At step S1, the X-ray tube 21 and multi-channel detector 24 are moved to be opposed to each other at a desired position of scanning (in practice, the radiographic table 12 is rectilinearly moved).

At step S2, axial scanning or helical scanning is performed in order to acquire real data.

Figure 17A:
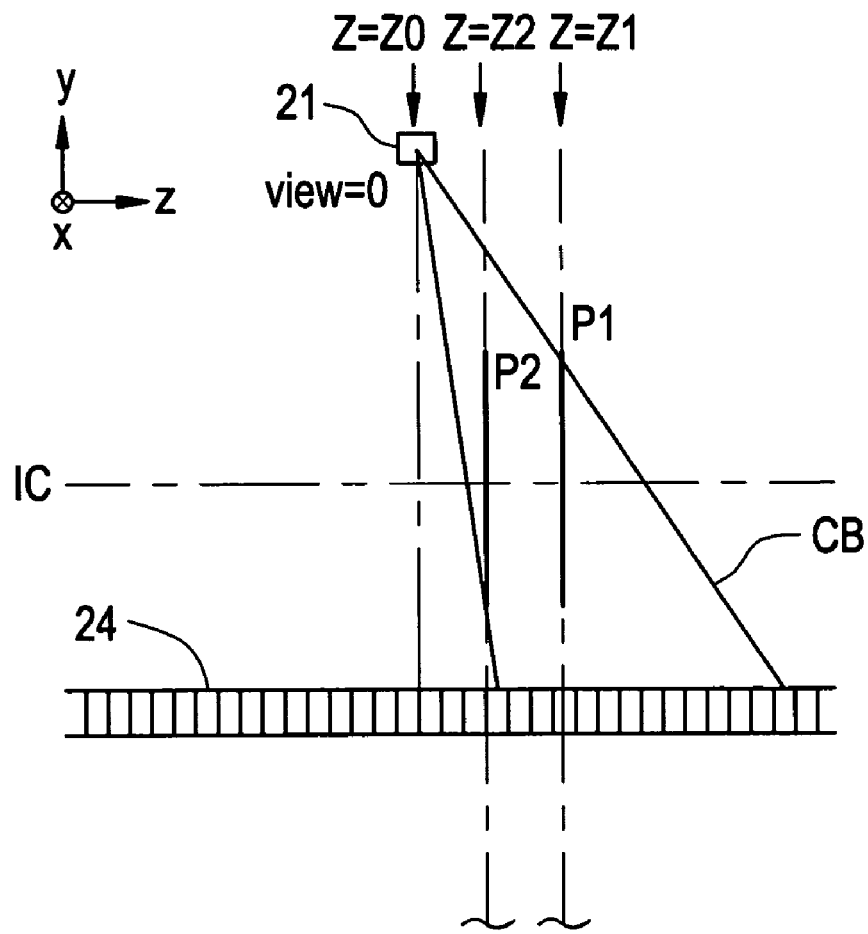
FIGS. 17a and 17b are explanatory diagrams illustrating the first and second reconstruction planes.

Herein, as shown in FIG. 17, the X-ray tube 21 and multi-channel detector 24 are moved so that when the view angle view is 0°, they will be opposed to each other at the reference position Z=Z0. Real data shall be acquired in this state. Moreover, a CT image shall be constructed by weighting and summating a first CT image that expresses a first reconstruction plane P1 located at a first position Z=Z1, and a second CT image that expresses a second reconstruction plane P2 located at a second position Z=Z2.

Referring back to FIG. 16, at step S3, the acquired real data is subjected to preprocessing (including offset correction, logarithmic correction, X-ray dose correction, and sensitivity correction).

At step S4, a reconstruction plane number counter j is initialized to 1. Incidentally, reconstruction plane numbers are serial numbers assigned to reconstruction planes.

At step S5, a view number counter v is initialized to 1. Incidentally, view numbers are serial numbers assigned to all view angles view at which all views required for reconstruction of an image are acquired.

At step S7b, real data contained in the v-th view acquired by the detector arrays constituting the multi-channel detector 24 is projected onto the j-th reconstruction plane Pj in the direction of X-ray transmission in order to produce the j-th linear data Lji.

At step S8b, the j-th linear data Lji is interpolated or extrapolated in order to produce the j-th virtual reference linear data Kjn. The position of the j-th virtual reference linear data Kjn on the j-th reconstruction plane Pj corresponds to that of the reference linear data Kon on the reference reconstruction plane Po.

At step S12, if production of virtual reference linear data items Kjn from all views required for reconstruction of an image is not completed, processing proceeds to step S13. If the production is completed, processing proceeds to step S14.

At step S13, the view number counter v is incremented by one and processing returns to step S7b.

At step S14, if production of virtual reference linear data items Kjn to be deployed on all reconstruction planes is not completed, processing proceeds to step S15. If the production is completed, processing proceeds to step S16.

At step S15, the reconstruction plane number counter j is incremented by one. Processing then returns to step S5.

Figure 17B:
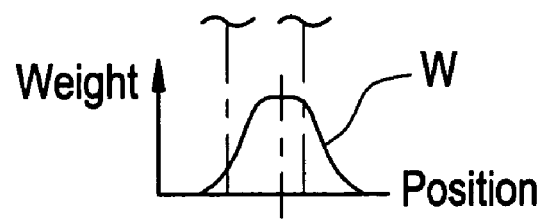

At step S16, virtual reference linear data items Kjn deployed on all reconstruction planes are weighted as shown in FIG. 17(b) and then summated in order to produce synthetic reference linear data Ksn.

At step S17, the reference procedure is performed on the synthetic reference linear data Ksn in order to produce back projection data D3(x,y).

At step S18, the back projection data D3(x,y) is post-processed in order to construct a CT image. Processing is then terminated.

According to the X-ray CT system of the second embodiment, the reference procedure adapted to the reference linear data Kon deployed on the reference reconstruction plane Po is preserved. Real data items associated with a plurality of reconstruction planes Pj whose positions relative to the multi-channel detector 24 are identical to or different from that of the reference reconstruction plane Po are used to produce synthetic reference linear data Ksn equivalent to the reference linear data Kon on the reference reconstruction plane Po. The reference procedure is adapted to the synthetic reference linear data Ksn in order to reconstruct a CT image. Consequently, production of a large amount of data that is not actually used to construct a CT image can be avoided. Moreover, Z-buffering can be executed within one reference procedure.

[Third Embodiment]

Figure 18:
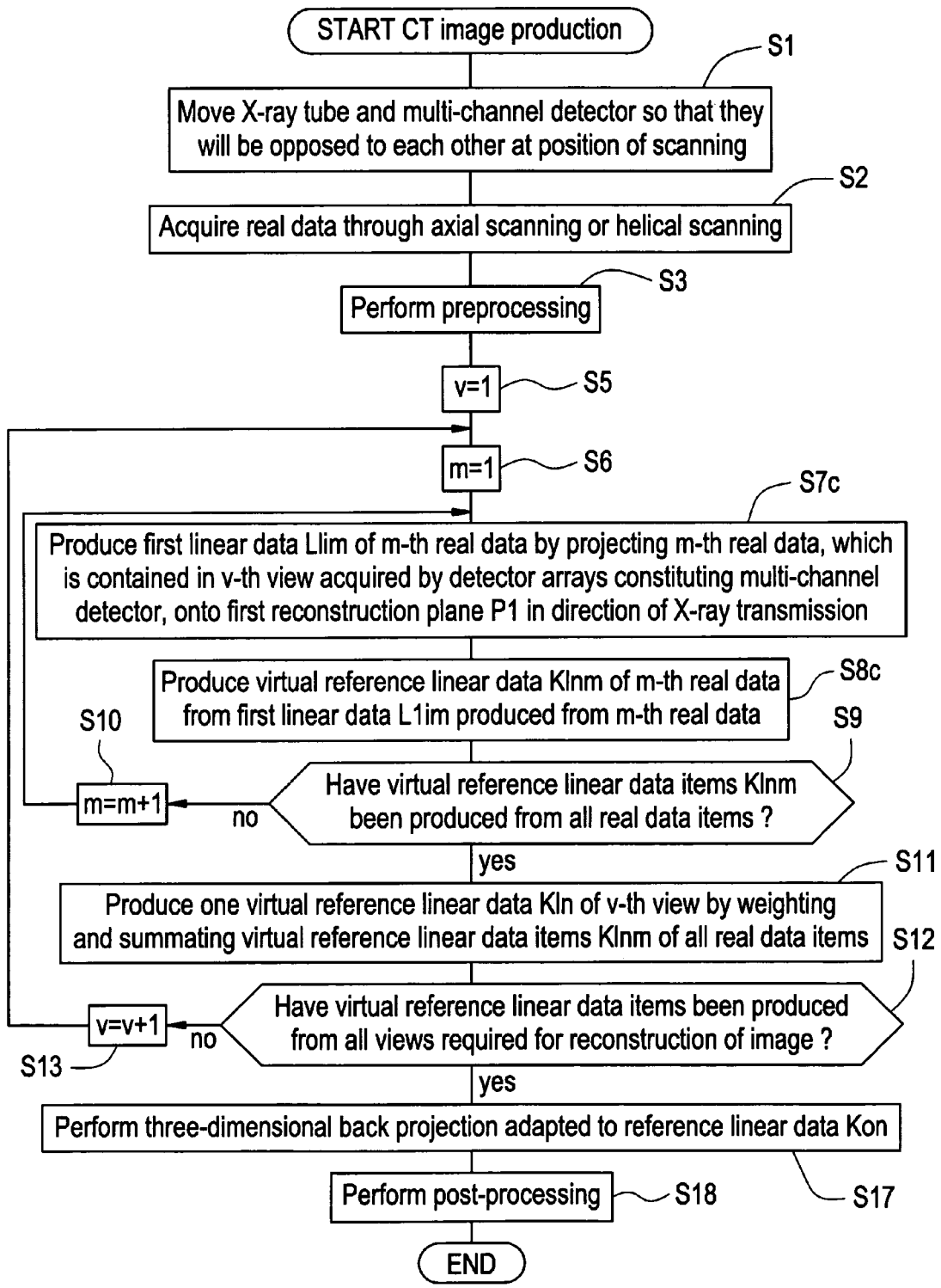
FIG. 18 is a flowchart describing CT image production in accordance with the third embodiment.

FIG. 18 is a flowchart illustrating CT image procedure in accordance with the third embodiment.

At step S1, the X-ray tube 21 and multi-channel detector 24 are moved to be opposed to each other at a desired position of scanning (in practice, the radiographic table 12 is rectilinearly moved).

At step S2, axial scanning or helical scanning is performed in order to acquire real data.

Figure 19A:
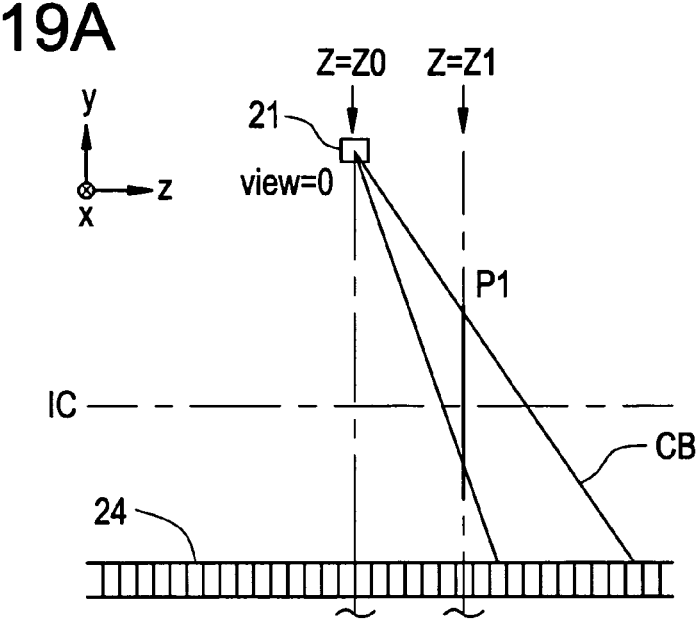
FIGS. 19a, 19b, and 19c are explanatory diagrams illustrating a plurality of real data items associated from the first reconstruction plane.
Figure 19B:
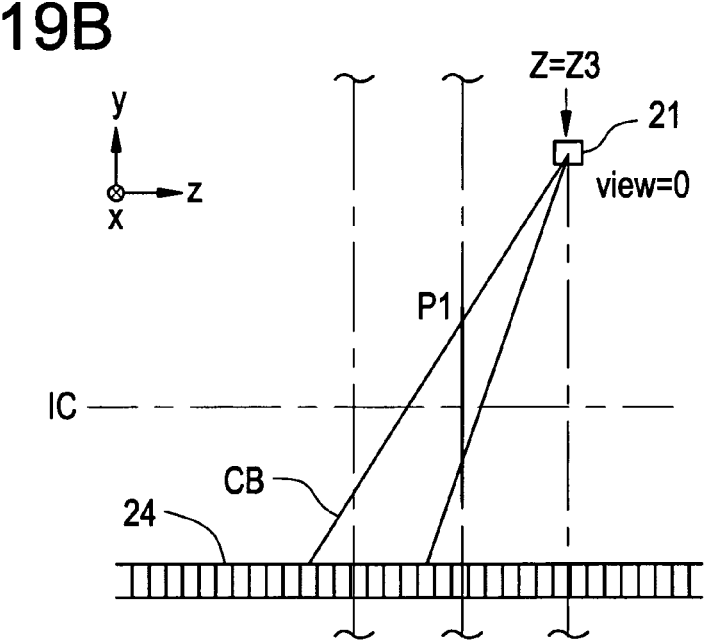

Herein, as shown in FIG. 19(a) and FIG. 19(b), the X-ray tube 21 and multi-channel detector 24 are moved so that when the view angle view is 0°, they will be opposed to each other at the reference position Z=Z0 or Z=Z3. Real data shall be acquired in this state. Consequently, if axial scanning is designated, it must be performed twice or more. Moreover, a CT image expressing a first reconstruction plane P1 located at a first position Z=Z1 shall be produced.

Referring back to FIG. 18, at step S3, the acquired real data is subjected to preprocessing (including offset correction, logarithmic correction, X-ray dose correction, and sensitivity correction).

At step S5, a view number counter v is initialized to 1.Incidentally, view numbers are serial numbers assigned to all view angles view at which all views required for reconstruction of an image are acquired.

At step S6, a real data number counter m is initialized to 1. Incidentally, real data numbers are serial numbers assigned to real data items contained in the same view or an opposite view and acquired at different positions.

At step S7c, the m-th real data contained in the v-th view acquired by the detector arrays constituting the multi-channel detector 24 is projected onto the first reconstruction plane P1 in the direction of X-ray transmission. This results in first linear data L1im of the m-th real data.

At step S8c, the first linear data L1im of the m-th real data is interpolated or extrapolated in order to produce first virtual reference linear data K1nm of the m-th real data. Herein, the position of the first virtual reference linear data K1n on the first reconstruction plane P1 corresponds to that of the reference linear data Kon on the reference reconstruction plane Po.

At step S9, if production of first virtual reference linear data items K1nm of all real data items contained in the v-th view is not completed, processing proceeds to step S10. If the production is completed, processing proceeds to step S11.

At step S10, the real data number counter m is incremented by one, and processing returns to step S7c.

Figure 19C:
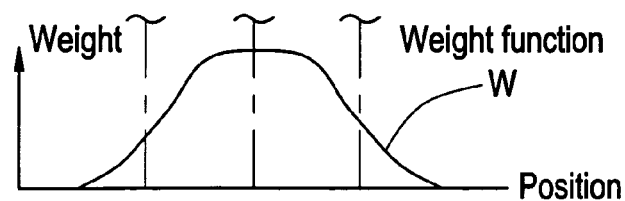

At step S1, the first virtual reference linear data items K1m produced from all the real data items are weighted as shown in FIG. 19(c) and then summated in order to produce one virtual reference linear data K1n of the v-th view.

At step S12, if production of first virtual reference linear data items K1n of all views required for reconstruction of an image is not completed, processing proceeds to step S13. If the production is completed, processing proceeds to step S17.

At step S13, the view number counter v is incremented by one, and processing returns to step S6.

At step S17, the reference procedure illustrated in FIG. 6 is performed on the first virtual reference linear data items K1n in order to produce back projection data D3(x,y). At step S18, the back projection data D3(x,y) is post-processed in order to construct a CT image. Processing is then terminated.

The aforesaid first to third embodiments are subsets of the fourth embodiment. Namely, when j and m are defined as j=1 and m=1 in the fourth embodiment, the fourth embodiment is identical to the first embodiment. When j and m are defined as j≧2 and m=1 in the fourth embodiment, the fourth embodiment is identical to the second embodiment. When j and m are defined as j=1 and m≧2 in the fourth embodiment, the fourth embodiment is identical to the third embodiment. In the exemplary embodiment, shown in FIG. 20, j=2 and m=2.

According to the X-ray CT system of the third embodiment, the reference procedure adapted to the reference linear data Kon deployed on the reference reconstruction plane Po is preserved. Virtual reference linear data items K1n equivalent to the reference linear data Kon on the reference reconstruction plane Po are produced from a plurality of real data items acquired at different positions. The reference procedure is adapted to the virtual reference linear data items K1n in order to reconstruct a CT image. Consequently, production of a large amount of data that is not actually used to construct a CT image can be avoided. Moreover, since a plurality of real data items is used to construct one CT image, an amount of information increases and image quality improves.

[Fourth Embodiment]

Figure 20:
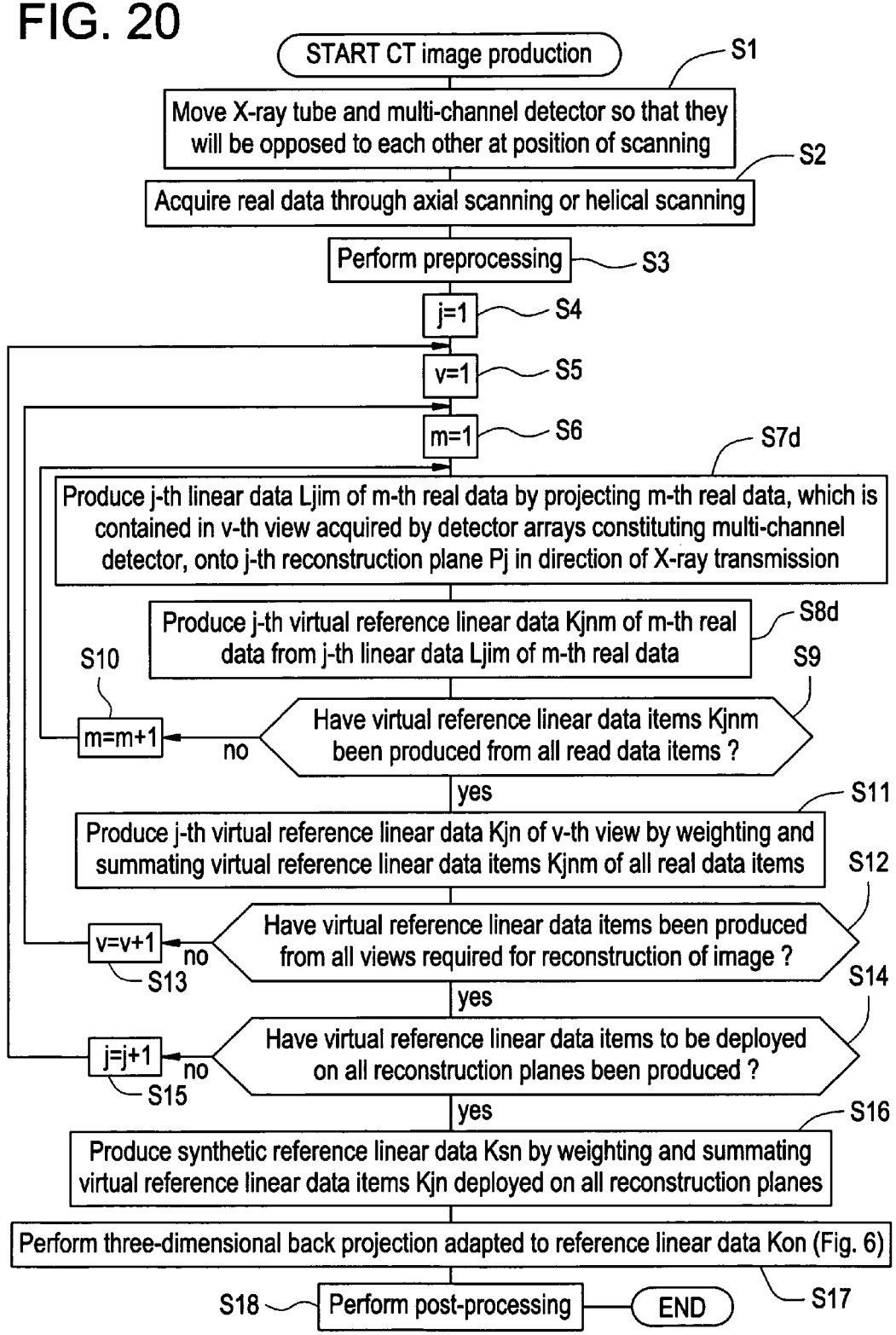
FIG. 20 is a flowchart describing CT image production in accordance with the fourth embodiment.

FIG. 20 is a flowchart describing CT image production in accordance with the fourth embodiment.

The aforesaid first to third embodiments are subsets of the fourth embodiment. Namely, when j and m are defined as j=1 and m=1 in the fourth embodiment, the fourth embodiment is identical to the first embodiment. When j and m are defined as j≧2 and m=1 in the fourth embodiment, the fourth embodiment is identical to the second embodiment. When j and m are defined as j=1 and m≧2 in the fourth embodiment, the fourth embodiment is identical to the third embodiment.

At step S1, the X-ray tube 21 and multi-channel detector 24 are moved to be opposed to each other at a desired position of scanning (in practice, the radiographic table 12 is rectilinearly moved).

At step S2, axial or helical scanning is performed in order to acquire real data.

At step S3, the acquired real data is subjected to preprocessing (including offset correction, logarithmic correction, X-ray dose correction, and sensitivity correction).

At step S4, a reconstruction plane number counter j is initialized to 1. Incidentally, reconstruction plane numbers are serial numbers assigned to reconstruction planes.

At step S5, a view number counter v is initialized to 1. View numbers are serial numbers assigned to all view angles view at which all views required for construction of an image are acquired.

At step S6, a real data number counter m is initialized to 1. Real data numbers are serial numbers assigned to real data items contained in the same view or an opposite view and acquired at different positions.

At step S7d, the m-th real data contained in the v-th view acquired by the detector arrays constituting the multi-channel detector 24 is projected onto the j-th reconstruction plane Pj in the direction of X-ray transmission in order to produce the j-th linear data Ljim of the m-th real data.

At step S8d, the j-th linear data Ljim of the m-th real data is interpolated or extrapolated in order to produce the j-th virtual reference linear data Kjnm of the m-th real data. Herein, the position of the j-th virtual reference linear data Kjnm on the j-th reconstruction plane Pj corresponds to that of the reference linear data Kon on the reference reconstruction plane Po.

At step S9, if production of first virtual reference linear data items K1nm of all real data items contained in the v-th view is not completed, processing proceeds to step S10. If the production is completed, processing proceeds to step S11.

At step S10, the real data number counter m is incremented by one and processing returns to step S7d.

At step S11, the first virtual reference linear data items K1nm of all the real data items are weighted and summated in order to produce the j-th virtual reference linear data Kjn of the v-th view.

At step S12, if production of the j-th virtual reference linear data items Kjn of all views required for reconstruction of an image is not completed, processing proceeds to step S13. If the production is completed, processing proceeds to step S14.

At step S13, the view number counter v is incremented by one, and processing returns to step S6.

At step S14, if production of the virtual reference linear data items Kjn to be deployed on all reconstruction planes is not completed, processing proceeds step S15. If the production is completed, processing proceeds to step S16.

At step S15, the reconstruction plane number counter j is incremented by one, and processing returns to step S5.

At step S16, the virtual reference linear data items Kjn deployed on all reconstruction planes are weighted and summated in order to produce synthetic reference linear data Ksn.

At step S17, the reference procedure described in FIG. 6 is performed on the synthetic reference linear data Ksn in order to produce back projection data D3(x,y).

At step S18, the back projection data D3(x,y) is post-processed in order to construct a CT image. Processing is then terminated.

According to the X-ray CT system of the fourth embodiment, all the advantages of the first to third embodiments are provided.

[Fifth Embodiment]

The step R2 in FIG. 6 may be incorporated in step S7a in FIG. 11, step S7b in FIG. 16, step S7c in FIG. 18, or step S7d in FIG. 20.

Many widely different embodiments of the invention may be configured without departing from the spirit and the scope of the present invention. It should be understood that the present invention is not limited to the specific embodiments described in the specification, except as defined in the appended claims.

The invention claimed is:

1. A CT image production method comprising:
   preserving a reference procedure required for construction of a CT image based on reference linear data representing one line or a plurality of lines on a reference reconstruction plane;
   producing virtual reference linear data equivalent to the reference linear data from real data associated with a first reconstruction plane different from the reference reconstruction plane; and
   reconstructing a CT image using the reference procedure on the basis of the virtual reference linear data.

2. The CT image production method according to claim 1, wherein the virtual reference linear data equivalent to the reference linear data is produced from first linear data deployed by projecting real data, which is acquired by detector arrays included in a multi-channel detector, onto the first reconstruction plane in a direction of X-ray transmission.

3. An X-ray CT system comprising:
   an X-ray tube;
   a multi-channel detector;
   a scanning device for acquiring real data by relatively rotating at least one of the X-ray tube and the multi-channel detector about an object of radiography, or for acquiring real data by relatively rotating at least one of the X-ray tube and the multi-channel detector about the object of radiography and rectilinearly moving the X-ray tube and the multi-channel detector relative to the object of radiography;
   a reference procedure preserving device for preserving a reference procedure required for construction of a CT image based on reference linear data representing one line or a plurality of lines on a reference reconstruction plane;
   a virtual reference linear data producing device for producing virtual reference linear data equivalent to the reference linear data from real data associated with a first reconstruction plane different from the reference reconstruction plane; and
   a reconstructing device for reconstructing a CT image using the reference procedure on the basis of the virtual reference linear data.

4. The X-ray CT system according to claim 3, wherein the virtual reference linear data producing device produces the virtual reference linear data equivalent to the reference linear data from first linear data deployed by projecting real data, which is acquired by detector arrays included in the multi-channel detector, onto the first reconstruction plane in a direction of X-ray transmission.

5. An X-ray CT system comprising:
   an X-ray tube;
   a multi-channel detector;
   a scanning device for acquiring real data by relatively rotating at least one of the X-ray tube and the multi-channel detector about an object of radiography, or for acquiring real data by relatively rotating at least one of the X-ray tube and the multi-channel detector about the object of radiography and rectilinearly moving the X-ray tube and the multi-channel detector relative to the object of radiography;
   a reference procedure preserving device for preserving a reference procedure required for construction of a CT image based on reference linear data representing one line or a plurality of lines on a reference reconstruction plane;
   a virtual reference linear data producing device for producing first virtual reference linear data equivalent to the reference linear data from real data associated with a first reconstruction plane different from the reference reconstruction plane, and producing second virtual reference linear data equivalent to the reference linear data from real data associated with a second reconstruction plane different from the first reconstruction plane; and
   a reconstructing device for reconstructing one CT image using the reference procedure on the basis of data produced by weighting and summating the first virtual reference linear data and the second virtual reference linear data.

6. The X-ray CT system according to claim 5, wherein the virtual reference linear data producing device produces the first virtual reference linear data from first linear data deployed by projecting real data, which is acquired by detector arrays included in the multi-channel detector, onto the first reconstruction plane in a direction of X-ray transmission, and produces the second virtual reference linear data from second linear data deployed by projecting real data, which is acquired by detector arrays included in the multi-channel detector, onto the second reconstruction plane in the direction of X-ray transmission.

7. An X-ray CT system comprising:
   an X-ray tube;
   a multi-channel detector;
   a scanning device for acquiring real data by relatively rotating at least one of the X-ray tube and the multi-channel detector about an object of radiography, or for acquiring real data by relatively rotating at least one of the X-ray tube and the multi-channel detector about the object of radiography and rectilinearly moving the X-ray tube and the multi-channel detector relative to the object of radiography;
   a reference procedure preserving device for preserving a reference procedure required for construction of a CT image based on reference linear data representing one line or a plurality of lines on a reference reconstruction plane;
   a virtual reference linear data producing device for producing first virtual reference linear data equivalent to the reference linear data from first real data that is acquired at a first position and associated with a first reconstruction plane identical to or different from the reference reconstruction plane, and producing second virtual reference linear data equivalent to the reference linear data from second real data that is contained in the same view as the first real data is or in an opposite view, acquired at a second position different from the first position, and associated with the first reconstruction plane; and a reconstructing device for reconstructing one CT image using the reference procedure on the basis of data produced by weighting and summating the first virtual reference linear data and the second virtual reference linear data.

8. The X-ray CT system according to claim 7, wherein the virtual reference linear data producing device produces the first virtual reference linear data from first linear data deployed by projecting real data, which is acquired at the first position by detector arrays included in the multi-channel detector, onto the first reconstruction plane in a direction of X-ray transmission, and produces the second virtual reference linear data from second linear data deployed by projecting real data, which is acquired at the second position by detector arrays included in the multi-channel detector, onto the first reconstruction plane in the direction of X-ray transmission.

9. The X-ray CT system according to claim 3, wherein the lines are straight lines or curves formed by projecting detector arrays included in the multi-channel detector onto the reference reconstruction plane in the direction of X-ray transmission.

10. The X-ray CT system according to claim 3, wherein the lines refer to one straight line formed on the reference reconstruction plane or a plurality of straight lines formed thereon with a space corresponding to a plurality of pixels between adjoining lines.

11. The X-ray CT system according to claim 5, wherein the lines are straight lines or curves formed by projecting detector arrays included in the multi-channel detector onto the reference reconstruction plane in the direction of X-ray transmission.

12. The X-ray CT system according to claim 7, wherein the lines are straight lines or curves formed by projecting detector arrays included in the multi-channel detector onto the reference reconstruction plane in the direction of X-ray transmission.

13. The X-ray CT system according to claim 5, wherein the lines refer to one straight line formed on the reference reconstruction plane or a plurality of straight lines formed thereon with a space corresponding to a plurality of pixels between adjoining lines.

14. The X-ray CT system according to claim 7, wherein the lines refer to one straight line formed on the reference reconstruction plane or a plurality of straight lines formed thereon with a space corresponding to a plurality of pixels between adjoining lines.

* * * * *